United States Patent
Chen et al.

(10) Patent No.: US 8,106,642 B2
(45) Date of Patent: Jan. 31, 2012

(54) CURRENT MODE BUCK CONVERTER WITH FIXED PWM/PFM BOUNDARY

(75) Inventors: Chih-Ning Chen, Taipei (TW); Kang Sheng, Taoyuan County (TW)

(73) Assignee: Anpec Electronics Corporation, Hsin-Chu (TW)

( * ) Notice: Subject to any disclaimer, the term of this patent is extended or adjusted under 35 U.S.C. 154(b) by 0 days.

(21) Appl. No.: 12/871,921

(22) Filed: Aug. 31, 2010

(65) Prior Publication Data

US 2011/0241641 A1 Oct. 6, 2011

(30) Foreign Application Priority Data

Apr. 6, 2010 (TW) .............................. 99110546 A (51) Int. Cl.
*G05F 1/00* (2006.01)
(52) U.S. Cl. ...................... 323/284; 323/285
(58) Field of Classification Search .............. 323/282, 323/284, 285
See application file for complete search history.

(56) References Cited

U.S. PATENT DOCUMENTS

| | | | | |
|---|---|---|---|---|
| 4,837,495 | A * | 6/1989 | Zansky | 323/285 |
| 6,366,070 | B1* | 4/2002 | Cooke et al. | 323/284 |
| 6,828,766 | B2* | 12/2004 | Corva et al. | 323/284 |
| 2008/0218142 | A1* | 9/2008 | Uehara | 323/284 |
| 2009/0273325 | A1* | 11/2009 | Nakahashi et al. | 323/282 |
| 2009/0302820 | A1* | 12/2009 | Shimizu et al. | 323/285 |
| 2010/0066328 | A1* | 3/2010 | Shimizu et al. | 323/282 |
| 2010/0308783 | A1* | 12/2010 | Farley | 323/282 |
| 2011/0062929 | A1* | 3/2011 | Strydom et al. | 323/284 |
| 2011/0089918 | A1* | 4/2011 | Chang | 323/282 |
| 2011/0115770 | A1* | 5/2011 | Seo et al. | 323/282 |

* cited by examiner

*Primary Examiner* — Jue Zhang
(74) *Attorney, Agent, or Firm* — Winston Hsu; Scott Margo (57) ABSTRACT

A current mode buck converter is disclosed. The buck converter operates in a pulse width modulation (PWM) mode or a pulse frequency modulation (PFM) mode. To prevent an output inductor with various probable magnitudes from varying a decision boundary between the PWM mode and the PFM mode, the buck converter adaptively adjusts a triggering condition for the pulse frequency modulation mode according to an average value of an inductor current of the output inductor or AC components of the inductor current and a slope compensation current.

34 Claims, 7 Drawing Sheets

CURRENT MODE BUCK CONVERTER WITH FIXED PWM/PFM BOUNDARY

BACKGROUND OF THE INVENTION

1. Field of the Invention

The present invention is related to a current mode buck converter, and more particularly, to a current mode buck converter adaptively adjusting a trigger condition for a pulse frequency modulation mode according to an average of an inductor current or AC components of the inductor current and a slope compensation current, to prevent variations of an input voltage, an output voltage and the inductor current.

2. Description of the Prior Art

An electronic device generally includes various components requiring different operating voltages. Therefore, a DC-DC voltage converter is essential for the electronic device to adjust (step up or step down) and stabilize voltage levels. Based upon different power requirements, various types of DC-DC voltage converter, originating from a buck (step down) converter and a boost (step up) converter, are developed. Accordingly, the buck converter can decrease an input DC voltage to a default voltage level, and the boost converter can increase an input DC voltage. With advances in circuit technology, both the buck and boost converters are varied and modified to conform to different system architectures and requirements.

Figure 1:
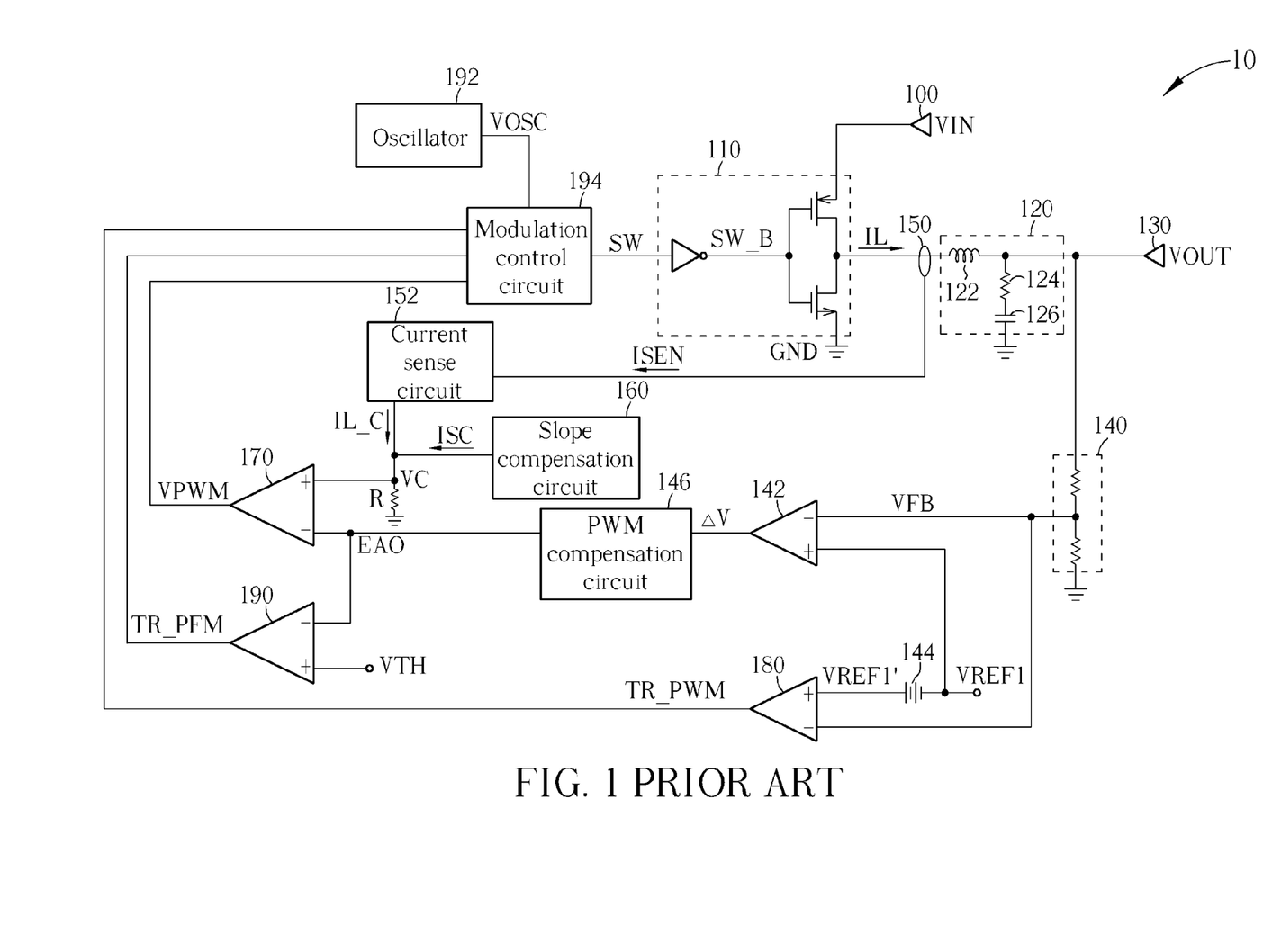
FIG. 1 is a schematic diagram of a buck converter of the prior art.

For example, please refer to FIG. 1, which is a schematic diagram of a buck converter 10 of the prior art. The buck converter 10 includes an input end 100, a switch module 110, an output module 120, an output end 130, a feedback module 140, an error amplifier 142, a voltage reduction circuit 144, a pulse width modulation (PWM) compensation circuit 146, a current sensor 150, a current sense circuit 152, a slope compensation circuit 160, a first comparator 170, a second comparator 180, a third comparator 190, an oscillator 192 and a modulation control circuit 194. The input end 100 is utilized for receiving an input voltage VIN. The switch module 110 is utilized for determining whether the input end 100 or a ground GND is electrically connected to the output module 120 according to a switch signal SW. The output module 120 is utilized for generating an output voltage VOUT based on frequency responses of an output inductor 122, an output resistor 124 and an output capacitor 126 and a conducting state of the switch module 110. The feedback module 140 is utilized for generating a divided voltage of the output voltage VOUT as a feedback signal VFB. The error amplifier 142 is utilized for amplifying a voltage difference between the feedback signal VFB and a first reference voltage VREF1 to generate a differential voltage ΔV. The voltage reduction circuit 144 is utilized for generating a divided voltage VREF1' slightly lower than the first reference voltage VREF1. The second comparator 180 is utilized for comparing the divided voltage VREF1' and the feedback signal VFB to generate a PWM trigger signal TR_PWM. With respect to feedback schemes other than the feedback signal VFB, the current sensor 150 detects an inductor current IL of the output inductor 122 to generate a sensing current ISEN. The current sense circuit 152 amplifies the sensing current ISEN to generate a mirror inductor current IL_C. The slope compensation circuit 160 is utilized for generating a slope compensation current ISC. A sum of the mirror inductor current IL_C and the slope compensation current ISC is converted into a sensing voltage VC by a resistor R. The PWM compensation circuit 146 is utilized for compensating a frequency response of the buck converter 10 according to the differential voltage ΔV to generate a compensation result EAO. The first comparator 170 is utilized for comparing the sensing voltage VC and the compensation result EAO to generate a PWM signal VPWM. The third comparator 190 is utilized for comparing the compensation result EAO and a fixed threshold voltage VTH to generate a pulse frequency modulation (PFM) trigger signal TR_PFM. The oscillator 192 is utilized for generating an oscillating signal VOSC. Finally, the modulation control circuit 194 determines which operation mode the buck converter 10 operates in based on the PFM trigger signal TR_PFM, the PWM trigger signal TR_PWM, the PWM signal VPWM and the oscillating signal VOSC, and generates the corresponding switch signal SW sent to the switch module 110.

In short, the buck converter 10 determines whether to operate in a PWM mode or a PFM mode based on the inductor current IL. When the inductor current IL is relatively low, the buck converter 10 switches from the PWM mode to the PFM mode to reduce a switching loss of the buck converter 10 by minimizing switching operations of the switch module 110. The buck converter 10 generates the PWM trigger signal TR_PWM and the PFM trigger signal TR_PFM according to the sensing current ISEN and the feedback signal VFB, and accordingly determines whether to operate in the PWM mode or the PFM mode.

Figure 2:
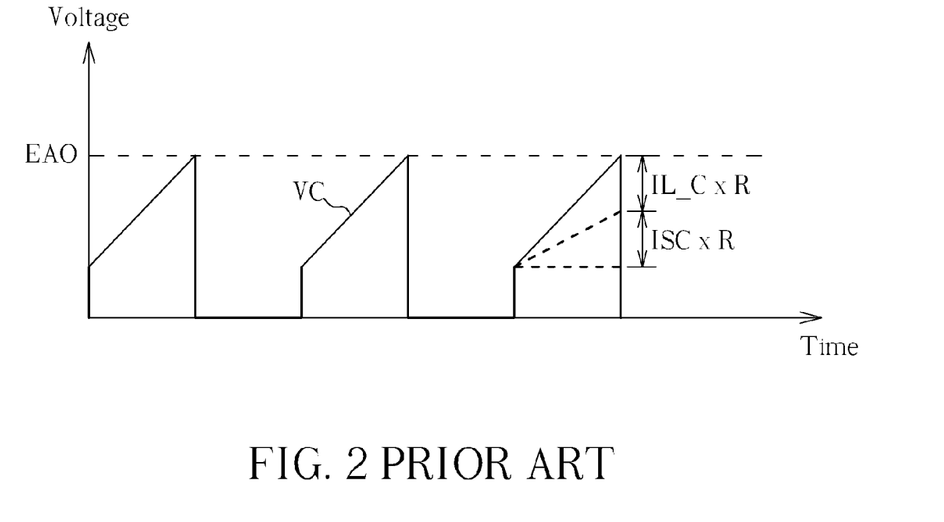
FIG. 2 is a time-variant schematic diagram of a compensation voltage of the buck converter shown in FIG. 1.
Figure 3:
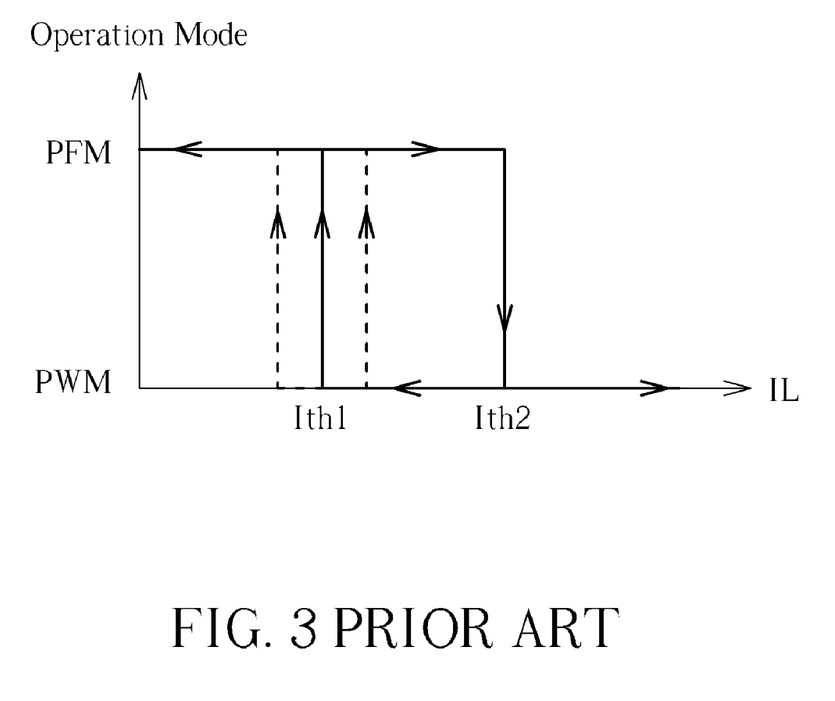
FIG. 3 is a schematic diagram of current thresholds of the buck converter shown in FIG. 1.

A period of the PWM signal VPWM is formed based on a period of intersection points of the compensation results EAO and peaks of a sum of the mirror inductor current IL_C and the slope compensation current ISC, as illustrated in FIG. 2. However, the sum of the mirror inductor current IL_C and the slope compensation current ISC varies with the input voltage VIN, the output voltage VOUT and inductance of the output inductor 122. In such a situation, the compensation result EAO has to be adjusted accordingly. That is, for the third comparator 190, a trigger condition for the PFM mode varies with the input voltage VIN, the output voltage VOUT and the inductance of the output inductor 122. For example, under a condition that the input voltage VIN and the output voltage VOUT are invariant, the larger the output inductor 122, the higher a current threshold Ith1 specifying a decision boundary from the PWM mode to the PFM mode, as illustrated in FIG. 3. In the worst case, the current threshold Ith1 is even greater than a current threshold Ith2 specifying a decision boundary from the PFM mode to the PWM mode, causing the buck converter 10 to oscillate between the PWM mode and the PFM mode and malfunction. To prevent the mode oscillation, one approach is to decrease the threshold voltage VTH. However, the threshold voltage adjustment probably results in a very small current threshold Ith1, implying that the PFM mode is inaccessible.

Therefore, fixing the decision boundaries between the PWM mode and the PFM mode has been a major focus of the industry.

SUMMARY OF THE INVENTION

It is therefore a primary objective of the claimed invention to provide a current mode buck converter.

The present invention discloses a current mode buck converter, which comprises an input end for receiving an input voltage, an output end for outputting an output voltage, a feedback module coupled to the output end for generating a feedback signal according to the output voltage, a switch module for determining whether the input end is electrically connected to a ground end according to a switch signal, an output module comprising an output inductor coupled between the switch module and the output end, an output resistor coupled to the output end, and an output capacitor coupled between the output resistor and the ground end, a current sensor coupled between the switch module and the output module for detecting an inductor current of the output inductor to generate a sensing current, a current sense circuit coupled to the current sensor for amplifying the sensing current to recover the inductor current for generating a first mirror inductor current and a second mirror inductor current, a slope compensation circuit coupled to the current sense circuit for generating a first slope compensation current and a second slope compensation current, a first resistor coupled to the current sense circuit and the slope compensation circuit for converting a sum of the first mirror inductor current and the first slope compensation current into a sensing voltage, an error amplifier coupled to the feedback module for amplifying a difference between the feedback signal and a first reference signal to generate a differential voltage, a pulse width modulation (PWM) compensation circuit coupled to the error amplifier for compensating a frequency response of the buck converter according to the differential voltage to generate a compensation result, a first comparator coupled to the current sense circuit the slope compensation circuit, the first resistor and the PWM compensation circuit for comparing the sensing voltage and the compensation result to generate a PWM signal, a second comparator coupled to the feedback module for comparing the feedback signal and a divided voltage of the first reference voltage to generate a PWM trigger signal, a third comparator for comparing a second reference voltage and a threshold voltage to generate a pulse frequency modulation (PFM) trigger signal, an oscillator for generating an oscillating signal, and a modulation control circuit coupled to the first comparator, the second comparator, the third comparator and the oscillator for generating the switch signal sent to the switch module according to the PWM trigger signal, the PFM trigger signal, the PWM signal and the oscillating signal.

These and other objectives of the present invention will no doubt become obvious to those of ordinary skill in the art after reading the following detailed description of the preferred embodiment that is illustrated in the various figures and drawings.

DETAILED DESCRIPTION

Figure 4A:
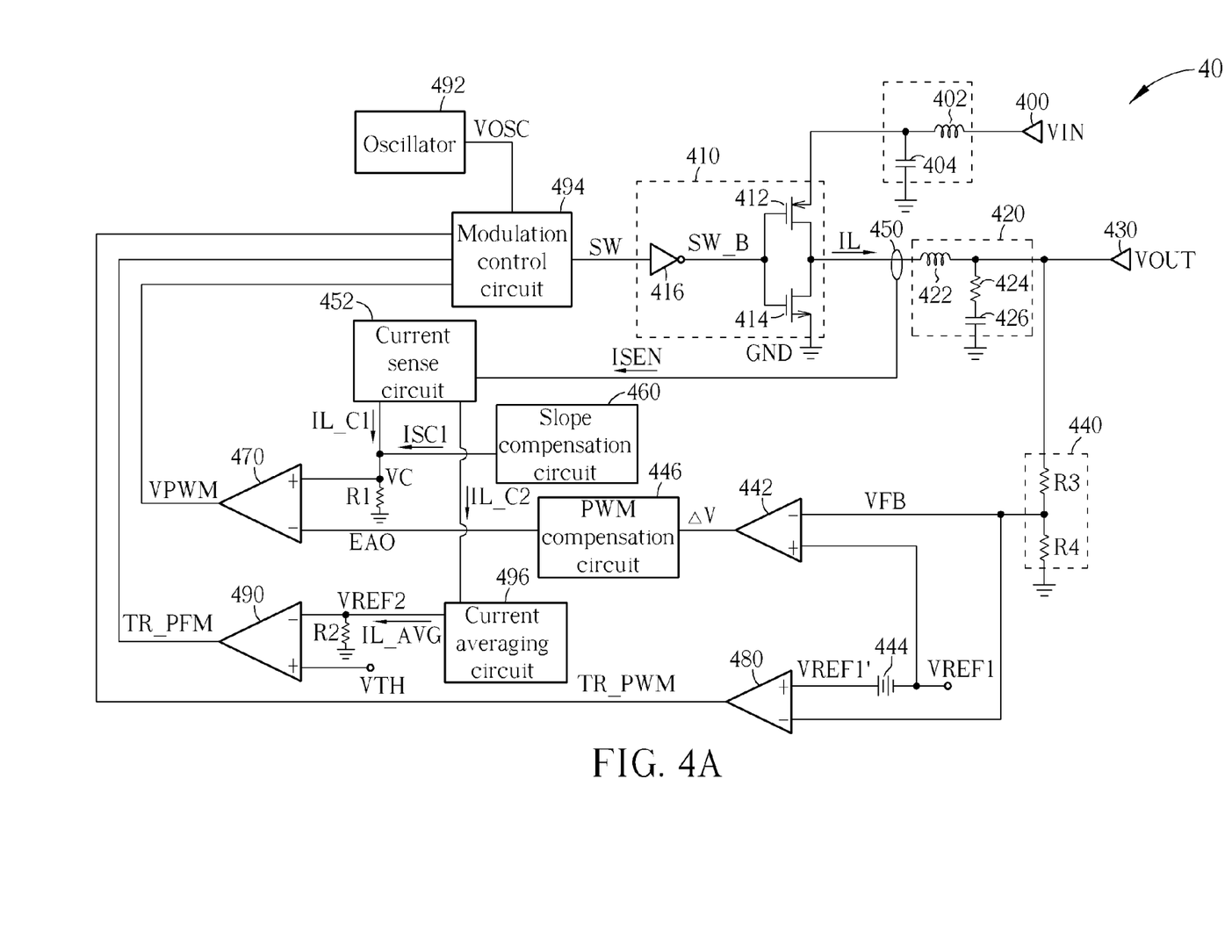
FIG. 4A is a schematic diagram of a buck converter according to an embodiment of the present invention.

Please refer to FIG. 4A, which is a schematic diagram of a current mode buck converter 40 according to an embodiment of the present invention. The buck converter 40 includes an input end 400, an output end 430, a feedback module 440, a switch module 410, an output module 420, a current sensor 450, a current sense circuit 452, a slope compensation circuit 460, a first resistor R1, a second resistor R2, an error amplifier 442, a pulse width modulation (PWM) compensation circuit 446, a first comparator 470, a second comparator 480, a third comparator 490, an oscillator 492, a modulation control circuit 494, an input inductor 402, an input capacitor 404, an voltage reduction circuit 444 and a current averaging circuit 496. The input end 400 is utilized for receiving an input voltage VIN. The input inductor 402 and the input capacitor 404 are utilized for performing low-pass filtering on the input voltage VIN. The switch module 410 is utilized for determining whether the input end 400 or a ground end GND is electrically connected to the output module 420 according to a switch signal SW. The output module 420 includes an output inductor 422, an output resistor 424 and an output capacitor 426, and is utilized for generating an output voltage VOUT based on frequency responses of the output inductor 422, the output resistor 424 and the output capacitor 426 and a conducting state of the switch module 410. The output end 430 is utilized for outputting an output voltage VOUT. The feedback module 440 is utilized for generating a feedback signal VFB according to the output voltage VOUT. The current sensor 450 is utilized for detecting an inductor current IL of the output inductor 422 to generate a sensing current ISEN. The current sense circuit 452 is utilized for amplifying the sensing current ISEN to recover the inductor current IL and generate a first mirror inductor current IL_C1 and a second mirror inductor current IL_C2. The slope compensation circuit 460 is utilized for generating a first slope compensation current ISC1. The first resistor R1 is utilized for converting a sum of the first mirror inductor current IL_C1 and the first slope compensation current ISC1 into a sensing voltage VC. The error amplifier 442 is utilized for amplifying a difference between the feedback signal VFB and a first reference signal VREF1 to generate a differential voltage ΔV. The PWM compensation circuit 446 is utilized for compensating a frequency response of the buck converter 40 according to the differential voltage ΔV to generate a compensation result EAO. The first comparator 470 is utilized for comparing the sensing voltage VC and the compensation result EAO to generate a PWM signal VPWM. The voltage reduction circuit 144 is for generating a divided voltage VREF1' slightly lower than the first reference voltage VREF1. The second comparator 480 is utilized for comparing the feedback signal VFB and a divided voltage VREF' to generate a PWM trigger signal TR_PWM. The current averaging circuit 496 is utilized for averaging the second mirror inductor current IL_C2 to generate an average inductor current IL_AVG. The second resistor R2 is utilized for converting the average inductor current IL_AVG into a second reference voltage VREF2. The third comparator 490 is utilized for comparing the second reference voltage VREF2 and a threshold voltage VTH to generate a pulse frequency modulation (PFM) trigger signal TR_PFM. The oscillator 492 is utilized for generating an oscillating signal VOSC. Finally, the modulation control circuit 494 generates the switch signal SW sent to the switch module 410 according to the PWM trigger signal TR_PWM, the PFM trigger signal TR_PFM, the PWM signal VPWM and the oscillating signal VOSC.

Figure 4B:
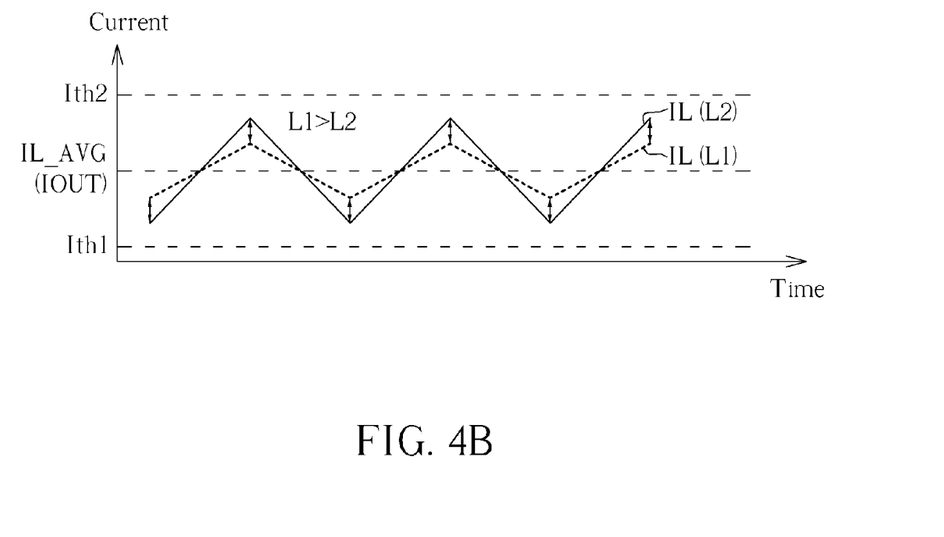
FIG. 4B is a time-variant schematic diagram of an inductor current of the buck converter shown in FIG. 4A.

In short, to fix the current threshold Ith1 varying with the input voltage VIN, the output voltage VOUT and the inductance of the output inductor 122 in the prior art, the buck converter 40 additionally includes the current averaging circuit 496 to calculate the average inductor current IL_AVG of the inductor current IL. As a result, even if the input voltage VIN, the output voltage VOUT and the inductance of the output inductor 422 are variant due to different applications or manufacturing process errors, and peaks of the inductor current IL are variant accordingly, a trigger condition for the PFM mode (triggered by the third comparator 490) is still invariant since the average inductor current IL_AVG is independent of the inductance of the output inductor 422. That is, the current threshold Ith1 is constant in buck converter 40, as illustrated in FIG. 4B.

Correspondingly, the threshold voltage VTH has to be a constant. As a result, regardless of the inductance of the output inductor 422 employed in the buck converter 40, the current threshold Ith1 specifying a decision boundary from the PWM mode to the PFM mode is invariant. Certainly, in order to send information of the inductor current IL to the current averaging circuit 496, the second mirror inductor current IL_C2 is preferably equal to the first mirror inductor current IL_C1.

Other than calculating the average inductor current IL_AVG, the present invention discloses another approach which compensates variations of the current threshold Ith1 caused by variations of the input voltage VIN, the output voltage VOUT and the inductance of the output inductor 422 based on alternating current (AC) components of the inductor current IL and the slope compensation current ISC. Please refer to FIG. 5, which is a schematic diagram of a buck converter 50 according to an embodiment of the present invention. The buck converter 50 is similar to the buck converter 40, but further includes a threshold adjustment circuit 500 which replaces the current averaging circuit 496 of the buck converter 40. The threshold adjustment circuit 500 is utilized for adaptively generating the threshold voltage VTH according to the second mirror inductor current IL_C2 and the second slope compensation current ISC2. That is, the buck converter 50 counteracts variations information of the inductor current IL and the slope compensation currents by feeding a "+" terminal of the third comparator 490 with variation information of the inductor current IL and the slope compensation current to fix current threshold Ith1.

Figure 5:
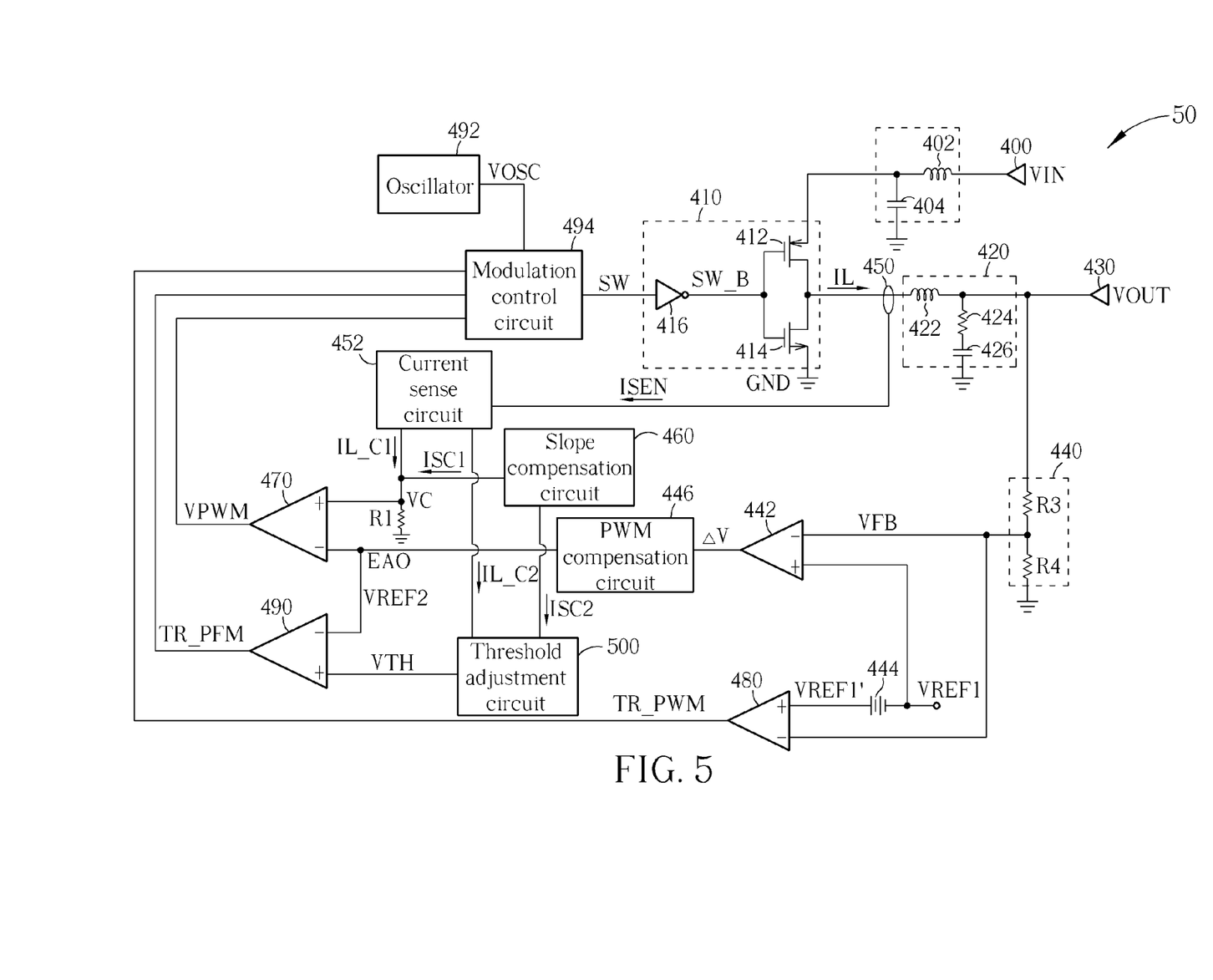
FIG. 5 is a schematic diagram of an alternative embodiment of the buck converter shown in FIG. 4A.

Correspondingly, in the buck converter 50, the third comparator 490 is further coupled to the PWM compensation circuit 446 and the first comparator 470 to receive the compensation result EAO as the second reference voltage VREF2.

Therefore, in FIG. 5, the second mirror inductor current IL_C2 is equal to AC components of the first mirror inductor current IL_C1, and the second slope compensation current ISC2 is equal to AC components of the first slope compensation current ISC1.

With respect to detailed operations of the buck converters 40, 50, the switch module 410 includes an upper-bridge switch transistor 412, a lower-bridge switch transistor 414 and an inverting amplifier 416, as illustrated in FIG. 4 and FIG. 5. The inverting amplifier 416 is utilized for inverting and amplifying the switch signal SW to generate an inverted signal SW_B sent to the upper-bridge switch transistor 412 and the lower-bridge switch transistor 414. The upper-bridge switch transistor 412 is a p-type metal-oxide semiconductor (MOS) transistor for determining whether the input end 400 is electrically connected to the output module 420 (charging path) according to the inverted signal SW_B. On the contrary, the lower-bridge switch transistor 414 is an n-type MOS transistor for determining whether the ground end GND is electrically connected to the output module 420 (discharging path) according to the inverted signal SW_B.

Figure 6:
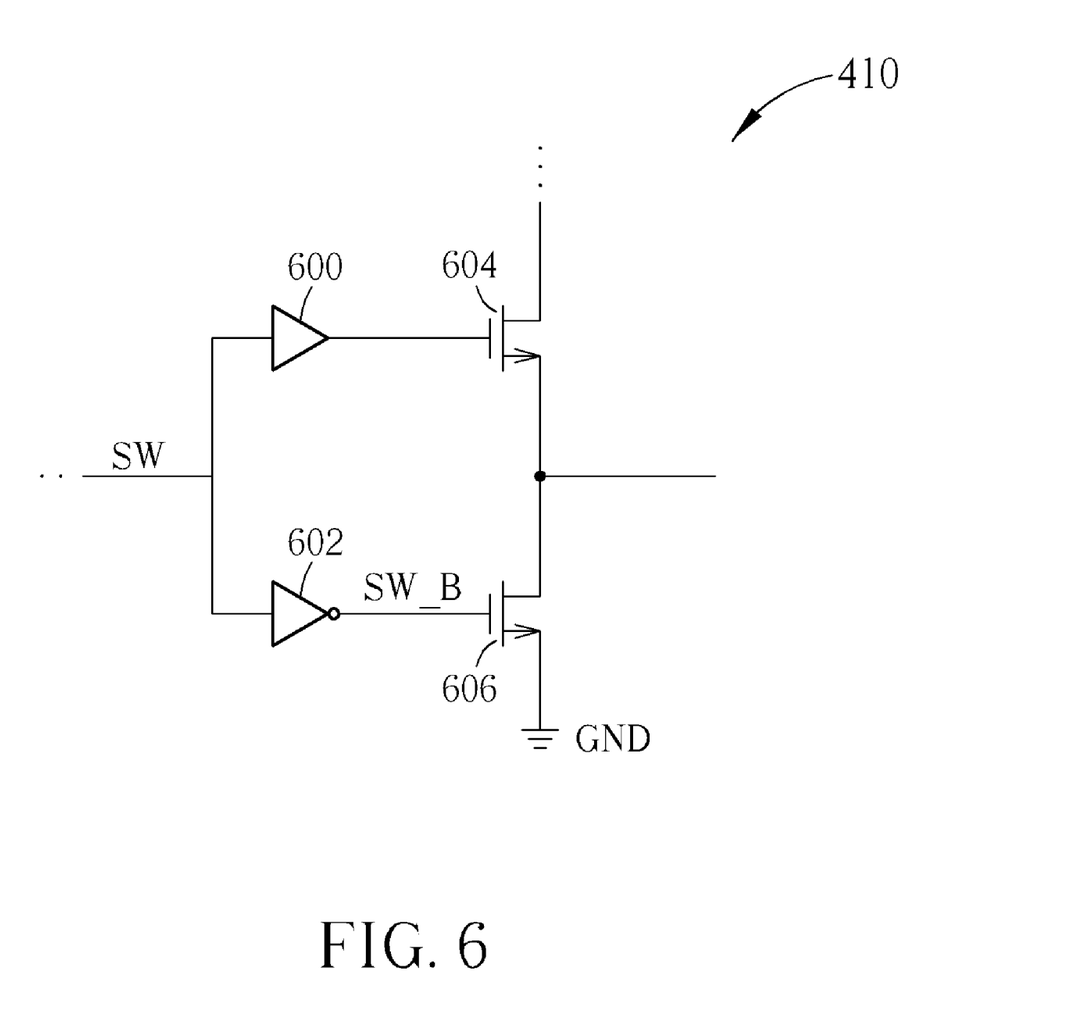
FIG. 6 is a schematic diagram of an alternative embodiment of a switch module of the buck converters shown in FIG. 4A and FIG. 5.

Certainly, those skilled in the art can make variations and modifications of the switch module 410. For example, please refer to FIG. 6, which is a schematic diagram of an alternative embodiment of the switch module 410. In FIG. 6, the switch module 410 includes an in-phase amplifier 600, an inverting amplifier 602, an upper-bridge switch transistor 604 (NMOS) and a lower-bridge switch transistor 606. Logic operations of the switch module 410 shown in FIG. 6 are well-known to those skilled in the art, and are not further narrated herein.

With respect to feedback routes of the buck converter 40, 50, the feedback module 440 includes a third resistor R3 and a fourth resistor R4 for dividing the output voltage VOUT and generating the feedback signal VFB. In addition, the voltage reduction circuit 444 is preferably a direct current (DC) voltage source or a voltage division circuit for generating the divided voltage VREF1' slightly lower than the first reference voltage VREF1.

Certainly, those skilled in the art can make modifications and variations to the buck converters 40, 50 to implement different applications. Furthermore, the inventive concepts of fixing the current threshold by computing the average inductor current or providing the AC components of the inductor current and the slope compensation current can be applied to a boost converter and a buck-boost converter as well.

In the prior art, the buck converter 10 determines whether to operate in the PWM mode or the PFM mode based on the inductor current IL. However, since the current threshold Ith1 specifying the decision boundary from the PWM mode to the PFM mode varies with the input voltage VIN, the output voltage VOUT and the inductance of the output inductor 122, the buck converter 10 is likely to oscillate operationally between the PWM mode and the PWM mode and malfunction. In comparison, the present invention compensates for variations of the current threshold Ith1 caused by the input voltage VIN, the output voltage VOUT and/or the inductance of the output inductor 422 by calculating the average inductor current IL_AVG or providing the AC components of the first mirror inductor current IL_C1 and the compensation current ISC, so as to fix the decision boundary from the PWM mode to the PFM mode.

To sum up, the present invention compensates for variations of the current threshold caused by the input voltage VIN, the output voltage VOUT and/or the inductance of the output inductor by calculating the average inductor current or providing the AC components of the first mirror inductor current and the compensation current ISC, so as to fix the decision boundary from the PWM mode to the PFM mode.

Those skilled in the art will readily observe that numerous modifications and alterations of the device and method may be made while retaining the teachings of the invention.

What is claimed is:

1. A current mode buck converter comprising:
an input end, for receiving an input voltage;
an output end, for outputting an output voltage;
a feedback module, coupled to the output end, for generating a feedback signal according to the output voltage;
a switch module, for determining whether the input end or a ground end is electrically connected to the output end according to a switch signal;
an output module, comprising:
   an output inductor, coupled between the switch module and the output end;
   an output resistor, coupled to the output end; and
   an output capacitor, coupled between the output resistor and the ground end;
a current sensor, coupled between the switch module and the output module, for detecting an inductor current of the output inductor to generate a sensing current;
a current sense circuit, coupled to the current sensor, for amplifying the sensing current to recover the inductor current for generating a first mirror inductor current and a second mirror inductor current;

a slope compensation circuit, coupled to the current sense circuit, for generating a first slope compensation current and a second slope compensation current;

a first resistor, coupled to the current sense circuit and the slope compensation circuit, for converting a sum of the first mirror inductor current and the first slope compensation current into a sensing voltage;

an error amplifier, coupled to the feedback module, for amplifying a difference between the feedback signal and a first reference signal to generate a differential voltage;

a pulse width modulation (PWM) compensation circuit, coupled to the error amplifier, for compensating a frequency response of the buck converter according to the differential voltage to generate a compensation result;

a first comparator, coupled to the current sense circuit, the slope compensation circuit, the first resistor and the PWM compensation circuit, for comparing the sensing voltage and the compensation result to generate a PWM signal;

a second comparator, coupled to the feedback module, for comparing the feedback signal and a divided voltage of the first reference voltage to generate a PWM trigger signal;

a third comparator, for comparing a second reference voltage and a threshold voltage to generate a pulse frequency modulation (PFM) trigger signal;

an oscillator, for generating an oscillating signal;

a modulation control circuit, coupled to the first comparator, the second comparator, the third comparator and the oscillator, for generating the switch signal sent to the switch module according to the PWM trigger signal, the PFM trigger signal, the PWM signal and the oscillating signal; and a current averaging circuit, coupled to the current sense circuit and the third comparator, for averaging the second mirror inductor current to generate an average inductor current.

2. The buck converter of claim 1 further comprising a second resistor, comprising one end coupled between the current averaging circuit and the third comparator and the other end coupled to the ground end, for converting the average inductor current into the second reference voltage.

3. The buck converter of claim 1, wherein the threshold voltage is constant.

4. The buck converter of claim 1, wherein the second mirror inductor current is equal to the first mirror inductor current.

5. The buck converter of claim 1 further comprising a threshold adjustment circuit, coupled to the current sense circuit, the slope compensation circuit and the third comparator, for adaptively generating the threshold voltage according to the second mirror inductor current and the second slope compensation current.

6. The buck converter of claim 5, wherein the third comparator is coupled to the modulation compensation circuit and the first comparator for receiving the compensation result as the second reference voltage.

7. The buck converter of claim 5, wherein the second mirror inductor current is equal to alternating current (AC) components of the first mirror inductor current.

8. The buck converter of claim 5, wherein the second slope compensation current is equal to AC components of the first slope compensation current.

9. The buck converter of claim 1, wherein the modulation control circuit generates the switch signal according to the PWM signal and the oscillating signal when the PWM trigger signal is enabled.

10. The buck converter of claim 1, wherein the switch module comprises:
a front end, for receiving the switch signal;
an upper-bridge switch transistor, coupled to the input end, the front end and the output module, for determining whether the input end is electrically connected to the output module according to an in-phase signal or an inverted signal of the switch signal; and
a lower-bridge switch transistor, coupled to the ground end, the front end and the output module, for determining whether the ground end is electrically connected to the output module according to the in-phase signal or the inverted signal of the switch signal.

11. The buck converter of claim 10, wherein the switch module further comprises an inverting amplifier, coupled to the front end, the upper-bridge switch transistor and the lower-bridge switch transistor, for inverting and amplifying the switch signal to generate the inverted signal sent to the upper-bridge switch transistor and the lower-bridge switch transistor.

12. The buck converter of claim 11, wherein the upper-bridge switch transistor is a p-type metal-oxide semiconductor (MOS) transistor, and the lower-bridge switch transistor is an n-type metal-oxide semiconductor (MOS) transistor.

13. The buck converter of claim 10, wherein the switch module further comprises:
an in-phase amplifier, coupled between the front end and the upper-bridge switch transistor, for amplifying the switch signal to generate the in-phase signal sent to the upper-bridge switch transistor; and
an inverting amplifier, coupled between the front end and the lower-bridge switch transistor, for inverting and amplifying the switch signal to generate the inverted signal sent to the lower-bridge switch transistor.

14. The buck converter of claim 13, wherein the upper-bridge switch transistor and the lower-bridge switch transistor are n-type MOS transistors.

15. The buck converter of claim 1, wherein the feedback module comprises:
a third resistor, comprising one end coupled between the output module and the output end and the other end coupled to the error amplifier; and
a fourth resistor, comprising one end coupled between the third resistor and the error amplifier and the other end coupled to the ground end.

16. The buck converter of claim 1 further comprising:
an input inductor, comprising one end coupled to the input end and the other end coupled to the switch module; and
an input capacitor, comprising one end coupled between the input inductor and the switch module and the other end coupled to the ground end.

17. The buck converter of claim 1 further comprising a voltage reduction circuit, coupled to the second comparator, for generating the divided voltage slightly lower than the first reference voltage.

18. A current mode buck converter comprising:
an input end, for receiving an input voltage;
an output end, for outputting an output voltage;
a feedback module, coupled to the output end, for generating a feedback signal according to the output voltage;
a switch module, for determining whether the input end or a ground end is electrically connected to the output end according to a switch signal;
an output module, comprising:
an output inductor, coupled between the switch module and the output end;
an output resistor, coupled to the output end; and an output capacitor, coupled between the output resistor and the ground end;
a current sensor, coupled between the switch module and the output module, for detecting an inductor current of the output inductor to generate a sensing current;
a current sense circuit, coupled to the current sensor, for amplifying the sensing current to recover the inductor current for generating a first mirror inductor current and a second mirror inductor current;
a slope compensation circuit, coupled to the current sense circuit, for generating a first slope compensation current and a second slope compensation current;
a first resistor, coupled to the current sense circuit and the slope compensation circuit, for converting a sum of the first mirror inductor current and the first slope compensation current into a sensing voltage;
an error amplifier, coupled to the feedback module, for amplifying a difference between the feedback signal and a first reference signal to generate a differential voltage;
a pulse width modulation (PWM) compensation circuit, coupled to the error amplifier, for compensating a frequency response of the buck converter according to the differential voltage to generate a compensation result;
a first comparator, coupled to the current sense circuit, the slope compensation circuit, the first resistor and the PWM compensation circuit, for comparing the sensing voltage and the compensation result to generate a PWM signal;
a second comparator, coupled to the feedback module, for comparing the feedback signal and a divided voltage of the first reference voltage to generate a PWM trigger signal;
a third comparator, for comparing a second reference voltage and a threshold voltage to generate a pulse frequency modulation (PFM) trigger signal;
an oscillator, for generating an oscillating signal;
a modulation control circuit, coupled to the first comparator, the second comparator, the third comparator and the oscillator, for generating the switch signal sent to the switch module according to the PWM trigger signal, the PFM trigger signal, the PWM signal and the oscillating signal; and
a threshold adjustment circuit, coupled to the current sense circuit, the slope compensation circuit and the third comparator, for adaptively generating the threshold voltage according to the second mirror inductor current and the second slope compensation current.

19. The buck converter of claim 18 further comprising a current averaging circuit, coupled to the current sense circuit and the third comparator, for averaging the second mirror inductor current to generate an average inductor current.

20. The buck converter of claim 19 further comprising a second resistor, comprising one end coupled between the current averaging circuit and the third comparator and the other end coupled to the ground end, for converting the average inductor current into the second reference voltage.

21. The buck converter of claim 19, wherein the threshold voltage is constant.

22. The buck converter of claim 19, wherein the second mirror inductor current is equal to the first mirror inductor current.

23. The buck converter of claim 18, wherein the third comparator is coupled to the modulation compensation circuit and the first comparator for receiving the compensation result as the second reference voltage.

24. The buck converter of claim 18, wherein the second mirror inductor current is equal to alternating current (AC) components of the first mirror inductor current.

25. The buck converter of claim 18, wherein the second slope compensation current is equal to AC components of the first slope compensation current.

26. The buck converter of claim 18, wherein the modulation control circuit generates the switch signal according to the PWM signal and the oscillating signal when the PWM trigger signal is enabled.

27. The buck converter of claim 18, wherein the switch module comprises:
a front end, for receiving the switch signal;
an upper-bridge switch transistor, coupled to the input end, the front end and the output module, for determining whether the input end is electrically connected to the output module according to an in-phase signal or an inverted signal of the switch signal; and
a lower-bridge switch transistor, coupled to the ground end, the front end and the output module, for determining whether the ground end is electrically connected to the output module according to the in-phase signal or the inverted signal of the switch signal.

28. The buck converter of claim 27, wherein the switch module further comprises an inverting amplifier, coupled to the front end, the upper-bridge switch transistor and the lower-bridge switch transistor, for inverting and amplifying the switch signal to generate the inverted signal sent to the upper-bridge switch transistor and the lower-bridge switch transistor.

29. The buck converter of claim 28, wherein the upper-bridge switch transistor is a p-type metal-oxide semiconductor (MOS) transistor, and the lower-bridge switch transistor is an n-type metal-oxide semiconductor (MOS) transistor.

30. The buck converter of claim 27, wherein the switch module further comprises:
an in-phase amplifier, coupled between the front end and the upper-bridge switch transistor, for amplifying the switch signal to generate the in-phase signal sent to the upper-bridge switch transistor; and
an inverting amplifier, coupled between the front end and the lower-bridge switch transistor, for inverting and amplifying the switch signal to generate the inverted signal sent to the lower-bridge switch transistor.

31. The buck converter of claim 30, wherein the upper-bridge switch transistor and the lower-bridge switch transistor are n-type MOS transistors.

32. The buck converter of claim 18, wherein the feedback module comprises:
a third resistor, comprising one end coupled between the output module and the output end and the other end coupled to the error amplifier; and
a fourth resistor, comprising one end coupled between the third resistor and the error amplifier and the other end coupled to the ground end.

33. The buck converter of claim 18 further comprising:
an input inductor, comprising one end coupled to the input end and the other end coupled to the switch module; and
an input capacitor, comprising one end coupled between the input inductor and the switch module and the other end coupled to the ground end.

34. The buck converter of claim 18 further comprising a voltage reduction circuit, coupled to the second comparator, for generating the divided voltage slightly lower than the first reference voltage.

* * * * *